(12) United States Patent
Pitz et al.

(10) Patent No.: US 10,466,680 B2
(45) Date of Patent: Nov. 5, 2019

(54) ORIENTATION METHOD FOR WORKPIECES

(71) Applicant: Siemens Aktiengesellschaft, München (DE)

(72) Inventors: Thomas Pitz, Rutesheim (DE); Ralf Spielmann, Stuttgart (DE)

(73) Assignee: Siemens Aktiengesellschaft, München (DE)

( * ) Notice: Subject to any disclaimer, the term of this patent is extended or adjusted under 35 U.S.C. 154(b) by 97 days.

(21) Appl. No.: 15/748,045

(22) PCT Filed: Jul. 11, 2016

(86) PCT No.: PCT/EP2016/066380
§ 371 (c)(1),
(2) Date: Jan. 26, 2018

(87) PCT Pub. No.: WO2017/016855
PCT Pub. Date: Feb. 2, 2017

(65) Prior Publication Data
US 2018/0224828 A1 Aug. 9, 2018

(30) Foreign Application Priority Data

Jul. 27, 2015 (EP) .................................... 15178412

(51) Int. Cl.
*G05B 19/00* (2006.01)
*G05B 19/408* (2006.01)
*G05B 19/4068* (2006.01)

(52) U.S. Cl.
CPC ..... *G05B 19/4086* (2013.01); *G05B 19/4068* (2013.01); *G05B 2219/32017* (2013.01);
(Continued)

(58) Field of Classification Search
None
See application file for complete search history.

(56) References Cited

U.S. PATENT DOCUMENTS 6,341,996 B1 * 1/2002 Brien ................. G05B 19/4069
451/10
2008/0092594 A1 * 4/2008 Vianello ................. B24B 9/102
65/61
(Continued)

FOREIGN PATENT DOCUMENTS

CN 101027616 A 8/2007
CN 101813931 A 8/2010
(Continued)

OTHER PUBLICATIONS

Chinese Search Report dated Jun. 14, 2018 with respect to counterpart Chinese patent application 201680037577.7.
(Continued)

*Primary Examiner* — Paul B Yanchus, III
(74) *Attorney, Agent, or Firm* — Henry M. Feiereisen LLC

(57) ABSTRACT

The invention relates to a method (100) for orientation of a workpiece (20) to be processed, comprising the steps of: a) providing a processing path (27) fixed on the workpiece for processing the workpiece (20); b) selecting a rigid transformation (30) of the positioning of the workpiece (20); c) simulating the processing path (27) taking account of the rigid transformation (30) of the positioning of the workpiece (20); d) determining at least one process variable (40) of the machining of the workpiece (20); wherein the steps b) to d) are repeated by modifying the at least one rigid transformation (30) of the positioning of the workpiece (20) until the at least one process variable (40) reaches a target value (43).

11 Claims, 5 Drawing Sheets

(52) U.S. Cl.
CPC .............. *G05B 2219/39361* (2013.01); *G05B 2219/50052* (2013.01); *G05B 2219/50148* (2013.01); *G05B 2219/50149* (2013.01); *G05B 2219/50151* (2013.01)

(56) References Cited

U.S. PATENT DOCUMENTS

| | | |
|---|---|---|
| 2009/0112357 A1 | 4/2009 | Hammond |
| 2010/0176099 A1 | 7/2010 | Hilderbrand |
| 2010/0228384 A1 | 9/2010 | Neumaier |
| 2012/0078406 A1 | 3/2012 | Lee et al. |
| 2012/0123600 A1 | 5/2012 | Krause |
| 2014/0343708 A1* | 11/2014 | Cecil, Jr. .............. G05B 19/182 700/98 |
| 2015/0355622 A1 | 12/2015 | Bretschneider et al. |
| 2016/0098035 A1 | 4/2016 | Sinn et al. |
| 2016/0103447 A1 | 4/2016 | Sinn et al. |

FOREIGN PATENT DOCUMENTS

| | | |
|---|---|---|
| DE | 4305408 A1 | 8/1994 |
| DE | 102012201732 A1 | 8/2013 |
| WO | WO 2008119549 A1 | 10/2008 |

OTHER PUBLICATIONS

Translation of Chinese Search Report dated Jun. 14, 2018 with respect to counterpart Chinese patent application 201680037577.7.
PCT International Search Report and Written Opinion of International Searching Authority dated Oct. 18, 2016 corresponding to PCT International Application No. PCT/EP2016/066380 filed Jul. 11, 2016.

* cited by examiner

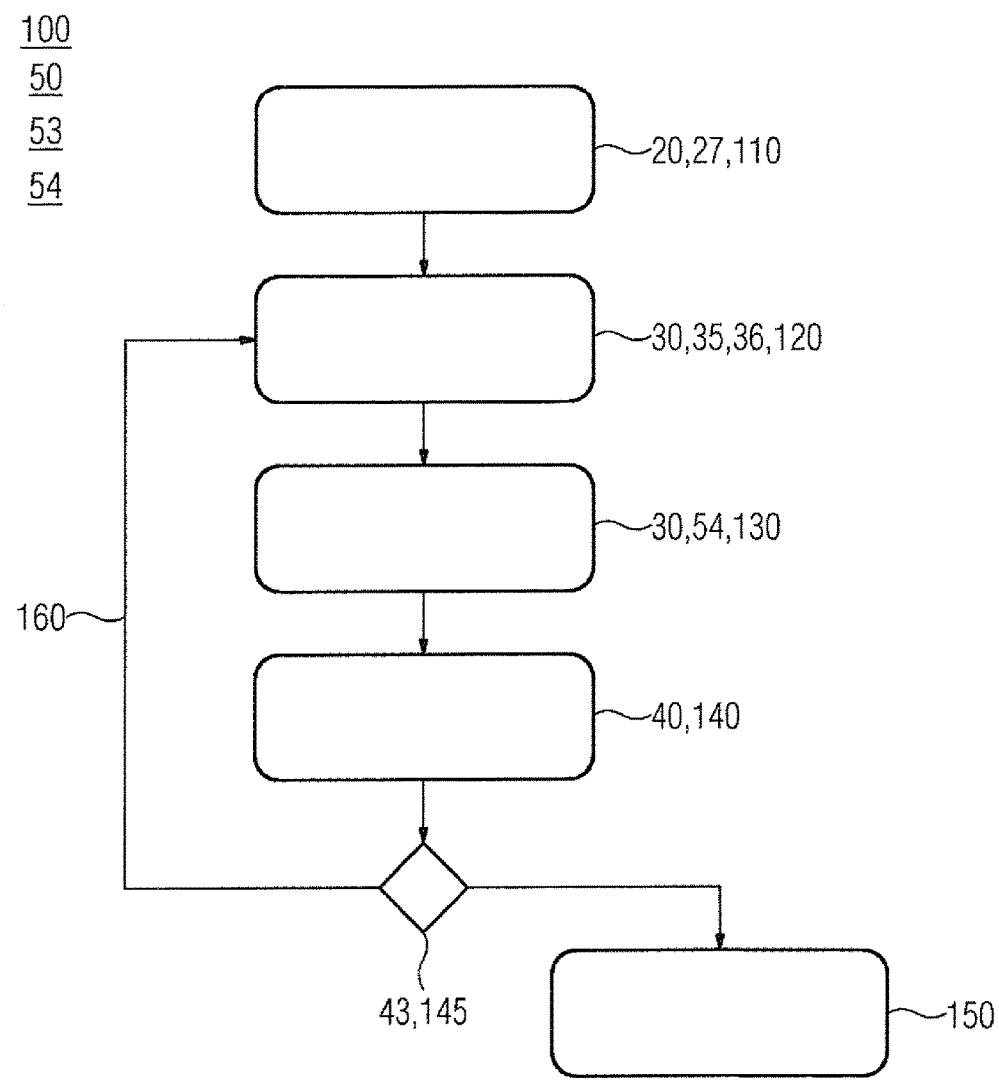

ORIENTATION METHOD FOR WORKPIECES

CROSS-REFERENCES TO RELATED APPLICATIONS

This application is the U.S. National Stage of International Application No. PCT/EP2016/066380, filed Jul. 11, 2016, which designated the United States and has been published as International Publication No. WO 20171016855 and which claims the priority of European Patent Application, Serial No. 15178412.1, filed Jul. 27, 2015, pursuant to 35 U.S.C. 119(a)-(d).

BACKGROUND OF THE INVENTION

The invention relates to a method for orientation of a workpiece, and to a suitable program, a suitable control unit, and a corresponding production machine.

A multiplicity of processing methods for workpieces are known in which an NC- or CNC-controlled tool or tool substitute (e.g. a laser dot or a printer head) is guided along a path relative to the workpiece. In this case, the tool and/or the workpiece is moved along its principal axis orientations by a plurality of driving means whose implementation determines the processing output that can be achieved. It is further known that by means of a modified spatial orientation of a workpiece that is to be processed, relative to the orientation of the principal axes, time savings can be achieved during processing. For this purpose, the workpiece is e.g. rotated by a specified angle and clamped. In this context, the corresponding angle is determined on the basis of manual trials by a user.

This is disadvantageous in that such an experimental means of determination is time-consuming. As a consequence, the theoretically achievable maximum time saving is often not achieved. A solution is generally required by means of which an optimum orientation of a workpiece is determined for a user without experimental effort.

SUMMARY OF THE INVENTION

The object of the invention is to provide a method which overcomes the disadvantages of the prior art and can be implemented in simple form in an existing production machine.

The object is achieved by the inventive method, in which a desired orientation is determined for a workpiece that is to undergo processing. In a first step, a control unit of a production machine provides a workpiece-fixed processing path, along which a tool of the production machine is to travel for the purpose of manufacturing the desired product. In this context, the workpiece-fixed processing path relates to a workpiece reference point and is defined in an associated workpiece axial system. Overall, the workpiece-fixed processing path is therefore defined in an object-specific reference system. In a further method step, a rigid transformation of the positioning of the workpiece is selected. The rigid transformation is understood here to be the location of the workpiece reference point relative to the production machine reference point in the associated tool axial system. The rigid transformation further comprises the orientation of the workpiece axial system in the production machine axial system. The selection of the rigid transformation is made by a program which is executed in the control unit of the tool control machine. In a next method step, travel along the workpiece-fixed processing path takes place, taking account of the rigid transformation of the workpiece positioning. During the simulation, at least one associated control instruction for at least one driving means of the production machine is calculated and stored. In a next method step, provision is made for evaluating the at least one control instruction that has been determined, such that a temporally triggered load on the driving means of the production machine can be identified. On this basis, at least one process variable is determined which characterizes the travel along the workpiece-fixed processing path during the processing.

According to the invention, the steps described above are repeated, modifying the rigid transformation of the workpiece positioning, and the associated process variable is determined in each case. The repetition of the method steps continues until the at least one process variable reaches a desired target value.

The inventive method makes it possible to evaluate a multiplicity of orientations of the workpiece and select a suitable orientation in a short time. The process variable to be evaluated can be selected by the user in this case, thereby allowing optimization in relation to a multiplicity of aspects. Furthermore, in the form of the processing path, the inventive method uses information which already exists and is necessary for the purpose of processing the workpiece. Moreover, the simulation of the processing path which is influenced by the rigid transformation takes place in a software module which is already present in a control unit of a modern production machine.

The invention is based on the surprising finding that an orientation which is beneficial to the desired process variable is already determined after a small number of simulation runs. The small number of simulation runs means that the claimed method can also be implemented in simple hardware with limited computing power. Consequently, the inventive method can be realized in a simple and inexpensive manner. According to the invention, the at least one process variable is a ratio of running times of the driving means for at least two axes of tool movement.

In a preferred embodiment variant of the invention, the rigid transformation comprises a translatory offset and/or an orientation angle of the workpiece as parameters. The translatory offset in this case is the position of the workpiece reference point relative to the machine reference point in its machine axial system. The orientation angle describes the angle at which axes of the workpiece axial system and the machine axial system intersect each other. In the case of a parallel orientation of the two axial systems, all orientation angles assume the value of zero degrees. Equally, the translatory offset is zero when the workpiece reference point falls within the machine reference point. A representation of the rigid transformation as a combination of a translatory offset and at least one orientation angle allows a compact representation of the rigid transformation, and therefore the inventive method can be performed quickly. The parameters reflect the orientation in which the workpiece must be clamped for the purpose of processing. By selecting and/or restricting the orientation angles to be modified and simulated, it is possible to replicate the technical possibilities that are feasible in the context of clamping. Consequently, the inventive method can be restricted to workpiece positioning options that can be realized easily. This further increases the efficiency of the claimed method.

In a particularly preferred embodiment variant of the invention, the ratio of the running times of the driving means of the at least two machine axes is essentially equal to one. The ratio of the running times of the two driving means therefore indicates the uniformity of the wear. The inventive method thereby allows processing of a workpiece to be adapted to the resilience of the individual driving means of the production machine by means of selecting a corresponding workpiece positioning. The downtimes of the production machine are thereby minimized, and the efficiency of the machining of the workpiece increases. The more uniform the wear to the driving means of the production machine, the shorter the downtimes.

If two driving means of the production machine are concurrently active during processing, e.g. using a milling cutter, the driving forces of both driving means are applied to the tool at the same time. As a result of the concurrent application of a plurality of driving forces, it is possible to achieve an increased processing speed, e.g. an increased cutting speed. The processing speed that can be achieved by combining two driving means is higher than the processing speed that can be achieved using only one driving means. Alternatively or additionally, it is also possible to achieve an energy saving or a reduction in wear by such a combination of a plurality of driving forces. The inventive method therefore makes it possible more fully to exploit the output potential of a production machine and further to increase the efficiency with which the workpiece is processed.

In a preferred embodiment variant of the invention, the target value to which at least one process variable is optimized is a maximum, a minimum or a selectable value. Therefore the inventive method can easily be adapted to a multiplicity of process variables. For example, it is also possible to envisage a minimum time duration for the processing of the workpiece, a minimum energy consumption, or a maximum processing speed of the tool. As a consequence, the claimed method can be adapted to a multiplicity of application areas.

In a further embodiment variant of the invention, the method steps described above are iteratively performed at least three times for at least one selectable parameter of the rigid transformation. In this case, the possible value range of the selectable parameter is divided into at least two intervals. Even when combining a plurality of selectable parameters, the required number of simulation runs is low. Equally, the number of values determined for the process variable is low, and therefore a maximum, a minimum or a selected target value can be identified with little computing effort. For example, an optimization can be effected on the basis of two parameters of the rigid transformation by means of six simulations of workpiece-fixed processing paths and subsequent determination of the at least one process variable in each case, if both parameters are modified separately consecutively. Furthermore, an optimization can be performed on the basis of two parameters using nine simulations of workpiece-fixed processing paths and determinations of the at least one process variable, if each parameter value of the first parameter of the rigid transformation is to be combined with all parameter values of the second parameter of the rigid transformation. By this means, the required computing effort and the demands on the hardware used for this purpose are further reduced by the inventive method without any loss of precision.

In a further embodiment variant of the inventive method, the target value is a result of a non-linear optimization, of a Newton method, or is an optimum of a least-square polynomial.

In a particularly preferred embodiment, the process variables which are calculated for each modification of the rigid transformation are used as interpolation nodes for the non-linear optimization, the Newton method or the least-square polynomial. Using this computing method, a mathematically described curve or surface is essentially suggested by the interpolation nodes. Such curves or surfaces can be analytically evaluated in mathematical terms with little computing effort, and therefore a maximum, a minimum or a value range can easily be determined. In particular, it is possible to identify maxima, minima or target ranges which lie between the interpolation nodes. Such a selection of a target value lying between the interpolation nodes makes it possible further to reduce the time or energy required for the processing. The computing methods can readily be used also to determine an optimum as a function of a multiplicity of parameters of the rigid transformation. It is consequently possible to evaluate a number of orientations of the clamped workpiece, said number being impracticably high for experimental determination of an optimized workpiece positioning. For example, as a result of rotating the workpiece orientation about a plurality of spatial axes, it is possible to achieve an overlap of driving means of three or more tool axes, resulting in a higher processing speed. The non-linear optimization, the Newton method and the least-square polynomial therefore allow the technical capacities of the production machine to be further exploited and the efficiency of the workpiece processing to be further increased. In this case, the inventive method is based on a low number of iteration steps and makes use of simple mathematical evaluation methods, which can also be implemented using simple hardware.

In a further particularly preferred embodiment variant of the invention, a first parameter of the rigid transformation is modified in a first run. If during the first run the differences in the values between the at least one process variable and its target value exceed a threshold value, this is identified as a stoppage of the desired optimization. In a second run following thereupon, a second parameter of the rigid transformation is then modified and, on the basis of differences of the determined values of the at least one process variable, a move towards the target value or a further stoppage of the desired optimization is identified. In addition to this, further parameters of the rigid transformation can be modified in further runs. For example, as a first parameter, the rotation of the workpiece about an axis perpendicular to a work table can be changed. Such rotation and clamping of the workpiece in the plane of the workpiece table can be implemented using simple means. In a particularly preferred embodiment, the first parameter of the rigid transformation, which is modified in the first run, is the geometric size that can most easily be implemented by a workholding device on the work table. The first parameter is most preferably an angle of rotation about a workpiece axis which is essentially perpendicular to the plane of the work table. If the desired target value is not reached or at least approached during the first run, orientations of the workpiece requiring a more resource-intensive workholding device are evaluated in the second run by modifying the second parameter. The greater the number of parameters of the rigid transformation that have to be adapted for optimum workpiece positioning, the greater the demands on the required workholding device. By successively modifying individual parameters of the rigid transformation, the inventive method reduces to practice the principle of incremental parameter variation. The user can select the order in which the parameters of the rigid transformation are modified in the first, second, third, etc. run. This means that the user can adapt the inventive method to the effort that is justified for a workholding device in the current processing method. Consequently, the inventive method can easily be adapted to a multiplicity of application scenarios and is therefore particularly cost-effective.

In a further embodiment variant of the invention, in the method step in which the workpiece-fixed processing path is travelled, taking account of the rigid transformation of the workpiece position, at least one boundary condition of the production machine is taken into account. In this case, the boundary condition of the production machine can be a maximum length of travel, a maximum acceleration, a maximum jolt and/or a maximum processing speed of the tool and/or workpiece along at least one tool axis or workpiece axis. If a contravention of such a boundary condition is detected, the corresponding rigid transformation is discarded for the further performance of the inventive method.

The object of the invention is further achieved by a program which can be stored in a memory of a control unit of a production machine and can be executed by an arithmetic unit in the control unit. The inventive program is designed to output control instructions to driving means of tool axes of the production machine. According to the invention, the program is also suitable for performing at least one of the above methods. In this case, the inventive program is based on software components, e.g. a simulation module, which are already present in a control unit of a production machine, and itself requires only limited computing power. This means that a production machine can easily be upgraded with the inventive program. The program is therefore suitable for a wide range of intended uses and allows existing production machines to be modified in an economical and performance-enhancing manner.

The object of the invention is also achieved by a control unit which is suitable for controlling at least one driving means of a production machine. For this purpose, the control unit has a memory and an arithmetic unit for executing a program. The program is designed to perform at least one of the inventive methods described above.

The object of the invention is equally achieved by a production machine which comprises a tool that can be moved in each case by at least one driving means along at least two tool axes or workpiece axes. The production machine further comprises a control unit having a memory in which the above described inventive program can be stored and executed. The inventive production machine is suitable for performing processing of a workpiece with a minimum time requirement, a minimum energy requirement and/or a minimum wear to the driving means.

BRIEF DESCRIPTION OF THE DRAWING

The invention is described in greater detail below with reference to individual embodiment variants in the figures, in which:

FIG. 5 schematically shows a sequence diagram of a fourth embodiment variant of the inventive method.

DETAILED DESCRIPTION OF PREFERRED EMBODIMENTS

Figure 1:
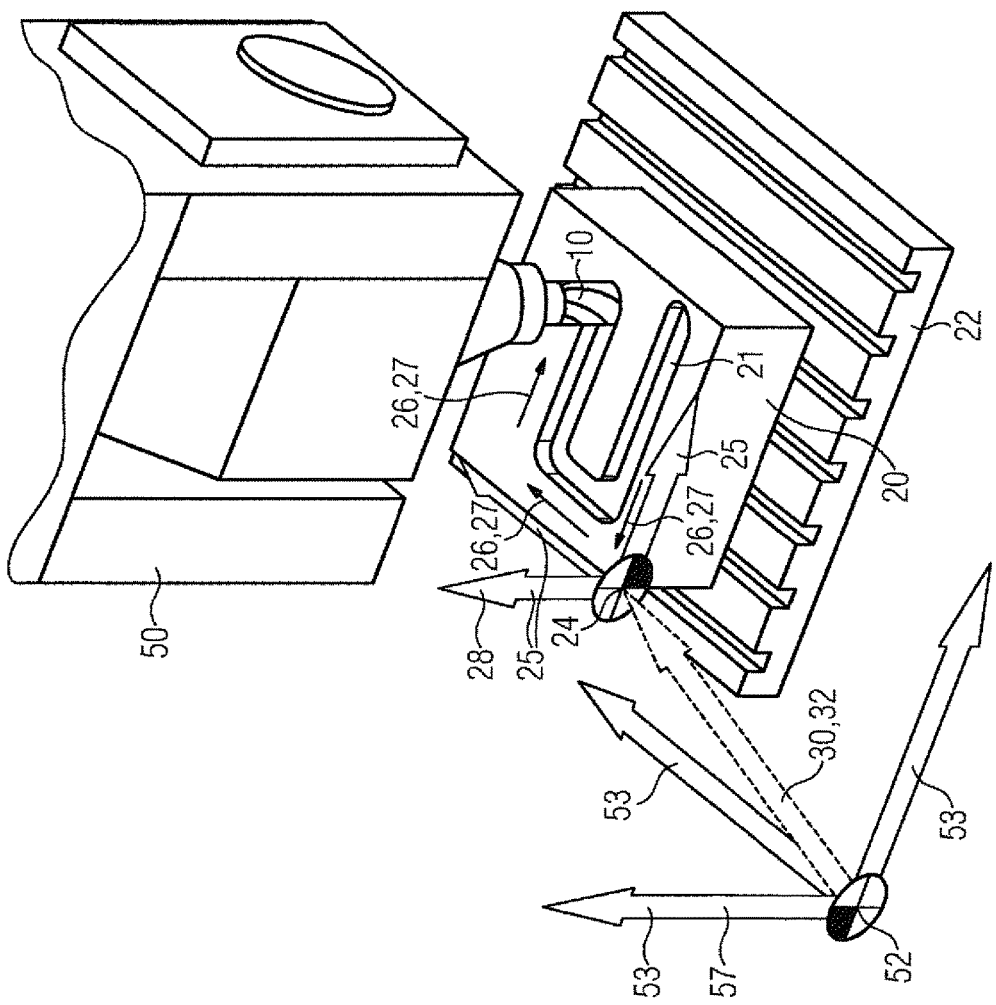
FIG. 1 shows workpiece processing according to the prior art.

Schematically illustrated in FIG. 1 is a workpiece 20 which is positioned on a work table 22 for machining by a tool 10 of a production machine 50. In the context of the metal-cutting reworking, a groove 21 is milled into a surface of the workpiece 20 by the tool 10. To this end, the tool 10 travels the length of a continuous processing path 27 along different directions of movement 26. The production machine 50 is equipped with driving means 54 (not illustrated in further detail) for the purpose of both moving the tool 10 along the processing path 27 and rotating tool 10. A tool reference point 24 which serves as a source for three workpiece axes 25 is situated at a corner of the workpiece 20. The processing path 27, which is composed of individual movements along the directions of movement 26, is stored and defined in the control unit 56 (not illustrated in further detail) of the production machine 50 with reference to the workpiece reference point 24 and the workpiece axes 25. The workpiece axes 25 according to FIG. 1 are oriented parallel to the machine axes 53, the source of which is in the machine reference point 52. Between the machine reference point 52 and the workpiece reference point 24 is a translational offset 32, which forms a rigid transformation 30 of the machine coordinate system 57 in the workpiece coordinate system 28. During the workpiece processing according to FIG. 1, the tool 10 only travels along sections of the processing path 27 which exhibit only one direction of movement 26 in each case, corresponding essentially to a work direction of a driving means 54 (not illustrated in further detail). Consequently, at no time during the workpiece processing in FIG. 1 is more than one driving means in operation.

Figure 2:
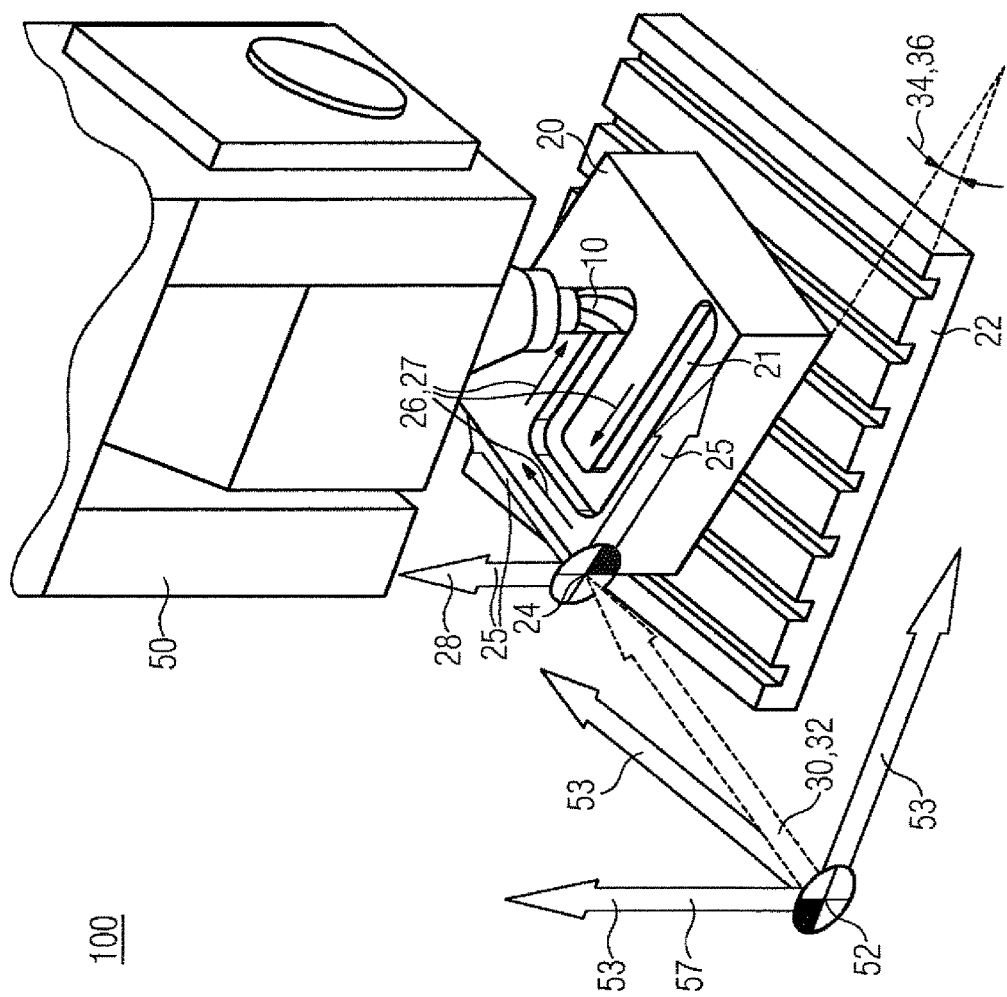
FIG. 2 shows workpiece processing with workpiece positioning from a first embodiment variant of the inventive method.

FIG. 2 shows the workpiece 20 being machined by a tool 10 of a production machine 50, wherein the workpiece 20 is oriented by means of the inventive method 100. The workpiece 20 is positioned on a work table 22 and has at one corner a workpiece reference point 24 which serves as a source for a plurality of workpiece axes 25. The workpiece reference point 24 and the workpiece axes 25 together form the tool coordinate system, with reference to which the processing path 27 travelled by the tool 10 is defined. The processing path 27 is composed of sections, whose respective direction of movement 26 is parallel to one of the workpiece axes 25. With reference to the workpiece 20, the same groove 21 is therefore produced as in FIG. 1.

FIG. 2 shows the machine reference point 52, which serves as a source for the machine axes 53. The machine axes 53 and the machine reference point 52 together form the machine coordinate system. The workpiece reference point 24 is separated from the machine reference point 52 by a translatory offset 32, this being one parameter of a rigid transformation 30 by means of which movements in the machine coordinate system 57 and in the workpiece coordinate system 28 can be converted into each other. The rigid transformation 30 further comprises an orientation angle 34, which lies between one of the machine axes 53 and one of the workpiece axes 25. The workpiece 20 is therefore rotated on the work table 22 about the orientation angle 34. When the tool 10 is moved along a section of the processing path 27, movement of the tool 10 takes place along two machine axes 53. Each of the machine axes 53 corresponds to an activation direction of a driving means 54. The individual sections of the processing path 27 are essentially diagonal in relation to the machine coordinate system 57. During the movements along the individual sections of the processing path 27, the processing forces which are generated by the driving means 54 and applied to the workpiece 20 are therefore superimposed. This means that the axial dynamics, i.e. speed, acceleration and jolt, are superimposed, resulting in faster path movements relative to the workpiece 20.

Figure 3:
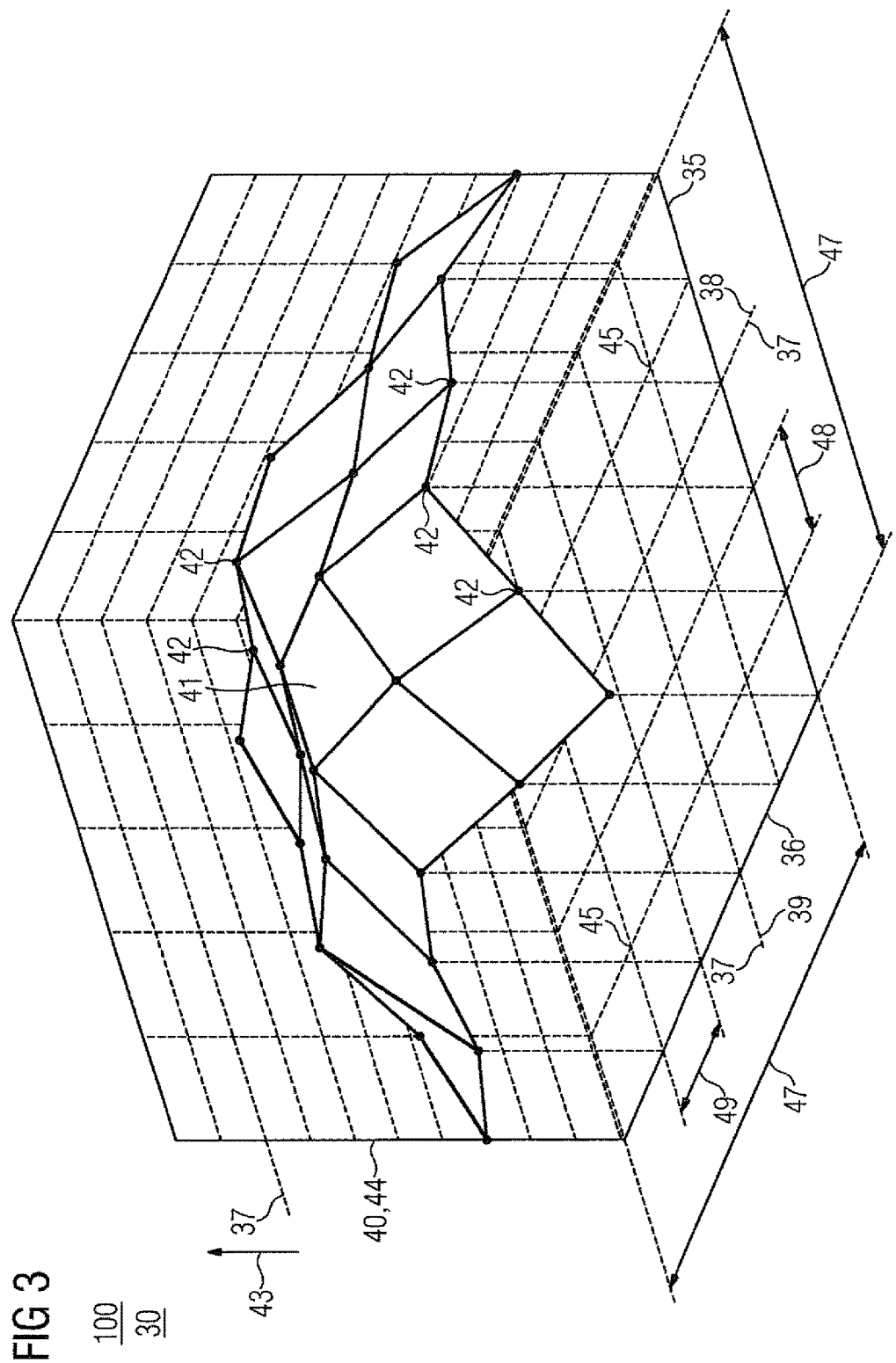
FIG. 3 shows a diagram of a process variable analysis according to a second embodiment variant of the invention.

Illustrated in FIG. 3 is a diagram of a process variable analysis of a second embodiment variant of the inventive method 100. The diagram comprises a first parameter axis 38, on which a first parameter 35 of a rigid transformation 30 is plotted relative to a zero line 37. The diagram also comprises a second parameter axis 39, on which a second parameter 36 of the rigid transformation 30 is plotted relative to a zero line 37. The parameter axes 38, 39 cover a plane in which the associated parameters 35, 36 are modified within a variation range 47 in each case. The modification of the parameters 35, 36 takes place in separate increments 48, 49 in this case.

An intersection point 45 of two values of the parameters 35, 36 in the plane covered by the parameter axes 38, 39 corresponds to a rigid transformation 30 for which the workpiece-fixed processing path 27 (not illustrated in further detail) is simulated in the inventive method 100, taking account of the respective rigid transformation 30. At each intersection point 45, the process variable 40 determined by the associated simulation is plotted along a process variable axis 44. The process variable axis 44 also has a zero line 37. Each of the intersection points 45 in the plane covered by the parameter axes 38, 39 corresponds to an interpolation node 42. The plurality of interpolation nodes 42 defines a segmented resulting surface 41, this being used in the inventive method 100 to determine the rigid transformation 30 in which the process variable 40 reaches the selectable target value 43. According to FIG. 3, the selected target value 43 is a maximum of the process variable 40.

Figure 4:
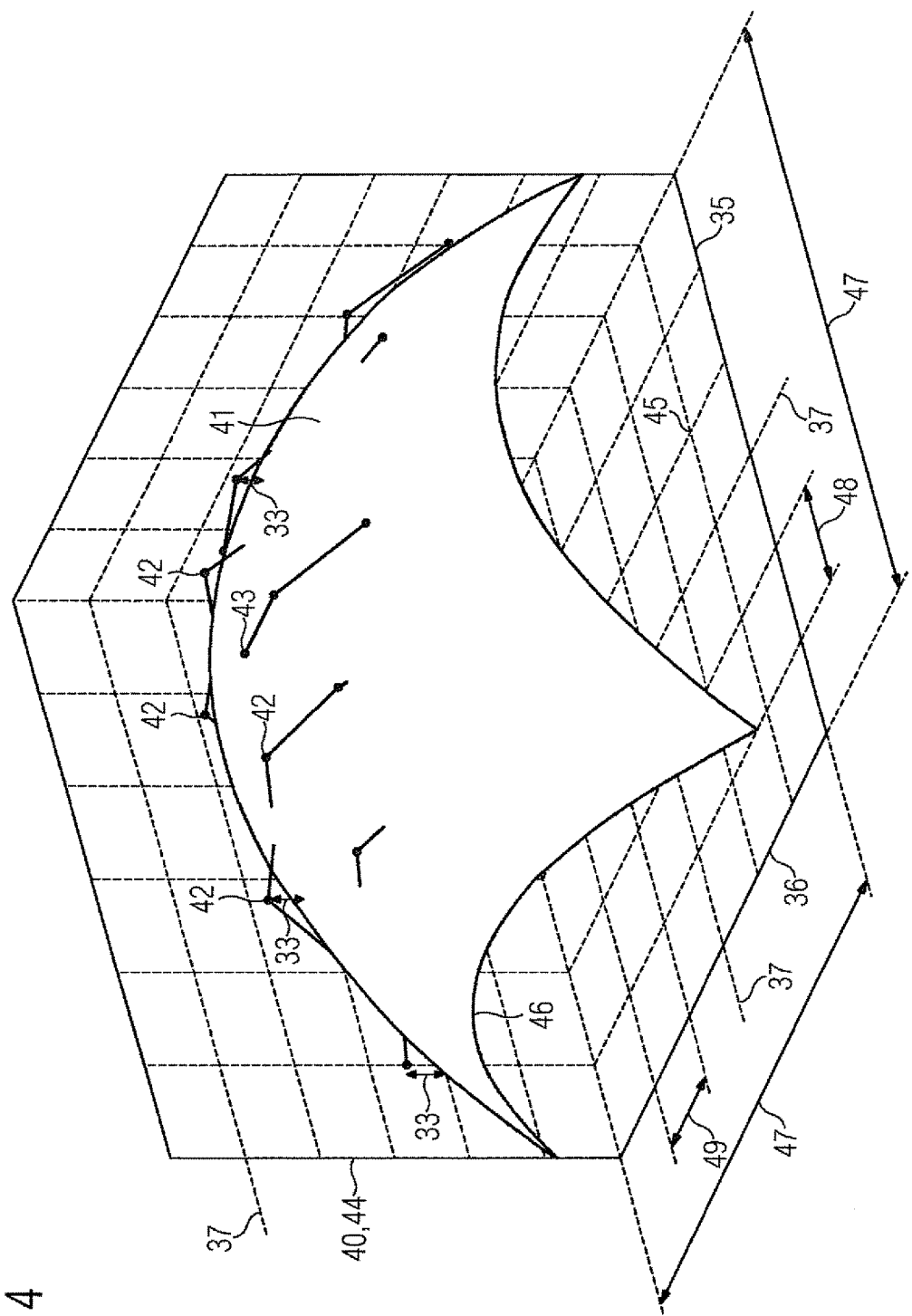
FIG. 4 shows a process variable analysis according to a third embodiment variant of the inventive method.

FIG. 4 schematically shows a diagram of a third embodiment variant of the inventive method 100. The diagram comprises a first parameter axis 38, on which a first parameter 35 of a rigid transformation 30 is plotted relative to a zero line 37. The diagram also comprises a second parameter axis 39, on which a second parameter 36 of the rigid transformation 30 is plotted relative to a zero line 37. The parameter axes 38, 39 cover a plane in which the associated parameters 35, 36 are modified within a variation range 47 in each case. The modification of the parameters 35, 36 takes place in separate increments 48, 49 in this case. An intersection point 45 of two values of the parameters 35, 36 in the plane covered by the parameter axes 38, 39 corresponds to a rigid transformation 30 for which the workpiece-fixed processing path 27 (not illustrated in further detail) is simulated in the inventive method 100, taking account of the respective rigid transformation 30. At each intersection point 45, the process variable 40 determined by the associated simulation is plotted along a process variable axis 44. The process variable axis 44 also has a zero line 37. Each of the intersection points 45 in the plane covered by the parameter axes 38, 39 corresponds to an interpolation node 42.

The interpolation nodes 43 are used as data for producing a least-square polynomial with which the continuous resulting surface 31 is determined. When determining the continuous resulting surface 41, the interpolation nodes 42 may also be situated outside of the resulting surface 41 along the process variable axis 44 with a tolerance 33. In addition, a desired maximum or minimum can easily be determined in a region between the interpolation nodes 43 on the continuous resulting surface 31.

Illustrated in FIG. 5 is a flow chart 5 of a fourth embodiment variant of the inventive method 100. In a first method step 110, a workpiece-fixed processing path 27 (not illustrated in further detail) is provided for the workpiece 20 that is to be machined. This is followed by a selection step 120, in which a rigid transformation 30 of the positioning of the workpiece 20 is selected. In this case, the rigid transformation 30 describes the location and orientation in which the workpiece 20 is to be clamped in the production machine 50 (not illustrated in further detail) during the machining. This is followed by a simulation step 130, in which the workpiece-fixed processing path 27 is travelled in a simulation, taking account of the rigid transformation 30 selected in the previous method step 120. In the context of the simulation, provision is made for determining which at least one control instruction to at least one driving means 54 of the production machine 50 results in travel along the workpiece-fixed processing path 27 when the workpiece 20 is clamped according to the rigid transformation 30.

In an evaluation step 140 following thereupon, provision is made for determining at least one process variable 40 which is derived from the selected machining of the workpiece 20. For example, the process variable 40 can be a ratio of running times of driving means 54 on different machine axes 53 of the production machine 50 in this case. This is followed by a check step 145, in which it is checked whether the at least one process variable 40 determined in the preceding evaluation step 140 reaches a selected target value 43. The target value 43 if a maximum, a minimum, or a selectable value in this case. If the desired target value 43 is reached, the corresponding rigid transformation 30 is output to a user as the result of the inventive method 100 at the method end 150. If the target value 43 is not reached, the inventive method 100 returns 160 to the selection step 120 and a new pass of the method 100 takes place. During the new pass, a rigid transformation 30 which is different to that from the previous pass is selected in the selection step 120. The rigid transformation 30 is modified for the new pass in that at least one parameter 35, 36 of the rigid transformation is changed.

The invention claimed is:

1. A method for the orientation of a workpiece that is to be machined, comprising the steps:
   a) providing a workpiece-fixed processing path for a machining of the workpiece;
   b) selecting a rigid transformation of a positioning of the workpiece;
   c) simulating the workpiece-fixed processing path taking account of the rigid transformation of the positioning of the workpiece;
   d) determining a process variable of the machining of the workpiece;
   e) determining a desired target value for the process variable;
   f) modifying the rigid transformation of the positioning of the workpiece and simulating the workpiece-fixed processing path taking account of the rigid transformation of the positioning of the workpiece in an iterative manner until the process variable reaches the target value; and
   g) orienting the workpiece,
   wherein the process variable is a ratio of running times of respective driving means of at least two machine axes and the target value is selectable.

2. The method according to claim 1, wherein the rigid transformation comprises as a parameter at least one selected from the group consisting of a translatory offset and an orientation angle of the workpiece.

3. The method according to claim 1, wherein the ratio of the running times of the driving means of the at least two machine axes is essentially equal to one.

4. The method according to claim 1, characterized in that the modifying and simulating of step f) is iteratively performed up to at least three times for a selectable parameter of the rigid transformation.

5. The method according to claim 1, wherein the target value is a result selected from the group consisting of a non-linear optimization, a Newton method, and an optimum of a least-square polynomial.

6. The method according to claim 5, wherein the process variable determined in step d) is interpolation nodes for the result.

7. The method according to claim 1, wherein a first parameter of the rigid transformation is modified in a first run and when the difference in the values between the process variable and its target value exceed a threshold value, a second parameter of the rigid transformation is modified in a second run.

8. The method according to claim 3, wherein step c) is performed taking account of a boundary condition of a production machine along the machine axis, wherein the boundary condition is selected from the group consisting of a maximum length of travel, a maximum acceleration, a maximum jolt, and a maximum cutting speed of the tool.

9. A program which runs in a memory of a control unit of a production machine and is configured to output control instructions to driving means of machine axes, said program configured to:
   a) provide a workpiece-fixed processing path for a machining of the workpiece;
   b) select a rigid transformation of a positioning of the workpiece;
   c) simulate the workpiece-fixed processing path taking account of the rigid transformation of the positioning of the workpiece;
   d) determine a process variable of the machining of the workpiece;
   e) determine a desired target value for the process variable; and
   f) modify the rigid transformation of the positioning of the workpiece and simulate the workpiece-fixed processing path taking account of the rigid transformation of the positioning of the workpiece in an iterative manner until the process variable reaches the target value,
   wherein the process variable is a ratio of running times of the driving means of the machine axes and the target value is selectable.

10. A control unit for controlling a driving means of a production machine, comprising a memory and an arithmetic unit for storing and executing a program configured to:
    a) provide a workpiece-fixed processing path for a machining of the workpiece;
    b) select a rigid transformation of a positioning of the workpiece;
    c) simulate the workpiece-fixed processing path taking account of the rigid transformation of the positioning of the workpiece;
    d) determine a process variable of the machining of the workpiece;
    e) determine a desired target value for the process variable; and
    f) modify the rigid transformation of the positioning of the workpiece and simulate the workpiece-fixed processing path taking account of the rigid transformation of the positioning of the workpiece in an iterative manner until the process variable reaches the target value,
    wherein the process variable is a ratio of running times of the driving means of the machine axes and the target value is selectable.

11. A production machine which comprises a tool that can be moved in each case by a driving means along at least two machine axes, and a control unit having a memory which is configured to store and execute a program, said program configured to:
    a) provide a workpiece-fixed processing path for a machining of the workpiece;
    b) select a rigid transformation of a positioning of the workpiece;
    c) simulate the workpiece-fixed processing path taking account of the rigid transformation of the positioning of the workpiece;
    d) determine a process variable of the machining of the workpiece;
    e) determine a desired target value for the process variable; and
    f) modify the rigid transformation of the positioning of the workpiece and simulate the workpiece-fixed processing path taking account of the rigid transformation of the positioning of the workpiece in an iterative manner until the process variable reaches the target value,
    wherein the process variable is a ratio of running times of the driving means of the machine axes and the target value is selectable.

* * * * *